3,232,721
SEALING SURFACE OF SOLID HYDROCARBON POLYMER-CONTAINING COMPOSITION
Herbert N. Coyner, Bartlesville, Okla., assignor to Phillips Petroleum Company, a corporation of Delaware
No Drawing. Filed Mar. 15, 1962, Ser. No. 180,026
6 Claims. (Cl. 44—7)

This invention relates to the sealing of the surface of a composition comprising, in solid form, a liquid hydrocarbon and a solid polyolefin. It also relates to the final sealed composition obtained. In one of its aspects, the invention relates to sealing a solid composition comprising a major portion of hydrocarbon which is normally fluid and a minor portion of a polymer of an olefin by heating the solid compositions sufficiently to permit the exteriormost surface or portion of the composition or solid to soften, flow, and to coalesce to form a continuous film which is substantially non-porous. In another of its aspects, the invention relates to the heating of the solid to seal the same by passing thereover a stream of hot gas. In a further aspect of the invention, the sealing can be accomplished by dipping the solid into a suitable hot liquid.

The use of charcoal as a fuel for grills, barbecues and other cooking equipment for broiling, barbecuing and grilling has gained great popularity in recent years, both for indoor and outdoor facilities. This can be attributed to a substantial lowering of the cost, the convenient forms now available and the improvement in the taste of food by charcoal cooking. The most serious drawback to the use of charcoal as a source of heat in broiling food on a grill is the initial difficulty encountered in getting the charcoal to burn to the desired more or less flameless bed of coals or embers required for grilling, barbecuing or broiling purposes. The kindling point of charcoal being higher than the temperature produced by an ordinary match, some method such as saturating or pouring on a highly flammable fuel before igniting with the match has been necessary. The use of the so-called lighter fluids is not only dangerous but also expensive since much of the fluid is lost by evaporation. This has been a deterrent to many persons who otherwise would avail themselves of the advantages of charcoal broiling. Thus, it can be seen there is a distinct need for an easily ignitable fuel that produces an intense heat, which is particularly adapted for house use as a charcoal lighter or starter fuel and which is not dangerous and inconvenient to handle. The present invention relates to an easily ignitable solid fuel body, which is not dangerous or inconvenient to handle, that can be used as a starter fuel.

In copending application, Serial Number 180,024, filed March 15, 1962, by James E. Kepple, there is described and claimed a solid composition comprising a normally liquid hydrocarbon and a minor portion of a solid polyolefin. Thus, in the said application, for example, there is claimed a composition comprising a hydrocarbon, which is normally liquid, and solid polyethylene, the solid polyethylene being present as a minor constituent of the composition which nevertheless is, to all intents and purposes as its physical characteristics are viewed, a solid.

Further, in Serial Number 180,005, filed March 15, 1962, by Charles R. Wilder, there is set forth, described and claimed a form-stable fuel composition comprising a normally liquid hydrocarbon fuel and a transpolymer of a conjugated diene or a mixture of a trans-polymer of a conjugated diene and a solid polyolefin.

The present invention is applicable to the solid compositions of the said applications in connection with which it will now be described.

It has been found that the solid compositions of the applications above-mentioned sometimes have a tendency, upon storage, or upon some heating to lose a portion of the liquid hydrocarbon therein contained. It has now been conceived that by heating the solid compositions under suitable conditions, it is possible to form a "skin" of the polymer contained in the composition and that this skin will render the solid substantially vapor-tight and, therefore, vapor-loss free.

It is an object of this invention to form a sealing surface upon a solid composition comprising a normally liquid hydrocarbon and a solid polymer.

It is another object of this invention to provide a substantially vapor-loss free solid composition comprising a normally fluid hydrocarbon and a solid polymer such as polyethylene and/or trans-polydiene.

A further object is to provide an easily ignitible fuel body adapted to be stored for long periods of time without substantial loss of hydrocarbon fuel therefrom.

Other aspects and objects and the several advantages of this invention are apparent from a study of this disclosure and the appended claims.

According to the present invention, a solid or rigid composition comprising a normally fluid or liquid hydrocarbon and a solid polymer is subjected to a temperature sufficiently elevated and for a period of time sufficient to cause a "skin" of melted polymer on the surface of the solid composition whereupon the skin is cooled and solidified, providing a thin skin of substantially nonporous polymer which serves to seal against loss of volatile hydrocarbons in the solid composition.

The thus-sealed, solid composition can be stored for very long periods of time, can be transported, even in water, as described in said Serial Number 180,024, filed March 15, 1962, by James E. Kepple, and generally can be more effectively utilized whenever, at least for a time, vapor-loss is to be substantially completely avoided.

In the practice of this invention, the solid composition is subjected to a high temperature fluid for a short period of time. The composition which contains 4–40 percent polyolefin may be shaped in the form of cubes, spheres, cylinders, bars, pellets, discs, logs, twigs, etc. The duration of exposure is long enough to soften the outer surface of the solid object and cause some flow of polymer, thus resulting in a thin skin of substantially nonporous polymer. The duration of such exposure is usually short enough to prevent excessive softening with resulting deformation and excessive loss of volatile hydrocarbons. The formation of the substantially continuous polymer film in this manner is generally accompanied by some removal of hydrocarbon liquid and some shrinkage in the size of the solid object.

The temperature of the high temperature fluid can vary widely from about 10° F. above the melting point of the polymer (about 270° F. in the case of high density polyethylene and about 170° F. in the case of the trans-diene polymer) to about 800° F. It will be obvious that considerably shorter durations of exposure are required when the fluid is near 800° F., and conversely, longer heating times are necessary when lower temperatures are used. The heating and sealing may be accomplished in as little as one second's time or may require as much as 30 minutes' time. In any event, the temperature will be sufficient and the time appropriate to form the "skin" as herein disclosed.

The fluid heating medium of this invention can be a gas such as air, nitrogen, helium, or carbon dioxide. When air is used, conditions must be such that no combustion occurs. Liquids can also be used. Particularly useful liquids are those which are essentially inert to the solid polymer-fluid hydrocarbon composition, having a boiling point which is sufficiently high, and which is, now, preferably polar in nature. An example of such a suitable liquid is ethylene glycol. Other liquids such as glycerol, dichlorobenzene, diethyl phthalate, and the like, can also be used. Similarly, solids which are molten liquids in the desired temperature range such as dichloronaphthalenes and the like can also be used. Further, radiant heating at an appropriate rate of heat input and for a suitable time can be used.

Immediately following the application of the heat treatment to the solid object, the object is cooled. The cooling rate is not considered critical except that cooling which is so rapid so as to encourage thermal shock should be avoided since the "skin" might be damaged.

As mentioned earlier, the film-forming operation is generally accompanied by removal of a small quantity of the liquid hydrocarbon located at the surface of the hydrocarbon-polymer object or body. When this operation is carried out on an expanded scale, the released hydrocarbon vapors can be conveniently recovered in a conventional condensing system and recycled to the original hydrocarbon solidification process.

It will be obvious to those who practice this invention that the thickness of the coating itself is capable of some variation. For example, by adjusting the temperature of the fluid, the duration of heat treatment, the velocity and direction of the gas flow (if a hot gas is used), or other heating factors, almost any coating thickness or even a non-uniform thickness can be obtained. For example, a solid object can be treated to possess a thick coating at one end tapering to a thin coating at the other end.

The high molecular weight solid polymers that can be employed to form solid combustible compositions according to the Kepple application, supra, includes polymers of 1-olefins having from 2 to 8 carbon atoms per molecule. The term "polymers of 1-olefins" includes homopolymers of the above described 1-olefins as well as copolymers of these 1-olefins with each other. Representative examples of suitable 1-olefins include ethylene, propylene, butene-1, pentene-1, hexene-1, heptene-1, 4-methylpentene-1, 5-methylhexene-1, 4,4-dimethylhexene-1,4-ethylhexene-1, octene-1, and the like. Suitable olefin polymers include polyethylene, polypropylene, poly-1-butene, poly-1-pentene and the like. The ethylene polymers prefered have a density ranging from 0.93 to 1.00, preferably from 0.94 to 0.98. The term "ethylene polymers" includes homopolymers of ethylene as well as copolymers of ethylene with minor amounts of higher olefins copolymerizable therewith such as propylene, 1-butene, 1-hexene, butadiene, isoprene, and the like. The preferred polypropylenes and poly-1-butenes have an isotactic content of at least 70%. The more preferred polymers are polyethylene and particularly high density polyethylene having an average molecular weight greater than about 100,000. A particularly preferred polyethylene is one prepared according to the method described and claimed in Patent No. 2,825,721, issued March 4, 1958, to John Paul Hogan and Robert L. Banks. However, the polymers applicable according to the invention can be prepared by any known method as long as the polymers have the above described properties. The ethylene polymers can be prepared by any of the known solution processes as well as the "particle form" process (polymerization of 1-olefins is carried out in suspension and below temperature at which any substantial portion of the polymer formed is in solution in the suspending medium).

The trans-diene polymers used in the solid fuel compositions of the invention according to the Wilder application, supra, include high trans-polybutadiene, high trans-polyisoprene, high trans-polypiperylene, and naturally occurring polymers of high trans content such as balata and guttapercha. These trans-diene polymers ordinarily have at least 70% of their molecular structure in the trans-1,4-configurations, preferably at least 85% of the polymer formed by trans-1,4-addition of the conjugated diene. It is also within the scope of the Wilder application to employ blends of a high trans-diene polymer and a solid 1-olefin polymer. The polymer compositions comprise from 5 to 100% trans-diene polymer, the remainder being a high molecular weight polymer of a 1-olefin as described in the Kepple application.

The synthetic high trans-polybutadienes, high trans-polyisoprenes, and high trans-polypiperylenes are prepared from 1,3-butadiene, isoprene, or piperylene using any suitable polymerization procedure by which such structures can be obtained. One convenient process for the production of such polymers involves solution polymerization of a conjugated diene having 4–5 carbon atoms in the presence of an initiator system comprising lithium aluminum hydride and titanium tetraiodide. Polymers prepared in this manner will contain 90 percent or more of materials in trans-1,4-configuration.

The solid compositions of the invention can be prepared from normally liquid hydrocarbons or hydrocarbon mixtures or fuels which boil from about 100° F. to about 900° F. and higher. Hydrocarbons that can be employed include saturated and unsaturated acyclic, saturated and unsaturated cyclic, and aromatic hydrocarbons or mixtures or combinations thereof. Parraffinic materials including hexanes, octanes, decanes, dodecanes, pentadecanes and the like as well as mixtures of these materials are preferred when smokelessness is particularly desirable. Petroleum refinery hydrocarbon fractions such as gasolines, kerosenes, stove oils, furnace oils, gas oils, cycle oils, diesel fuels, crude oils, topped crude, and the like are especially useful in the invention. The above hydrocarbon fractions ordinarily have flash points ranging from atmospheric to about 250° F. Preferred hydrocarbons are those paraffins or largely paraffinic mixtures or isoparaffinic mixtures which boil between about 200 and about 700° F. Still more preferred are those that boil between about 300 and about 500° F. When the compositions are used for burning, the paraffinic hydrocarbons are preferred because of their low smoke and cleaner burining properties.

A more comprehensive understanding of the invention can be obtained by referring to the following illustrative examples which are not intended, however, to be unduly limitative of the invention.

*Example I*

A pellet of solidified hydrocarbon about one inch in diameter (prepared by blending about 15 parts by weight of a polyethylene having a density of about 0.94 gm./cc. @ 25° C. with 85 parts by weight of an isoparaffinic hydrocarbon with a boiling range of 420–475° F. at one atmosphere for about 30 minutes at 170° C. followed by cooling after transferral of the resulting viscous solution to an appropriate mold) was exposed to a flow of nitrogen gas heated to about 400° F. at a rate of about 0.5 cubic foot per minute. After about a 2–3 minute exposure, the pellet was removed from this stream and cooled. The surface of the pellet was found to be substantially sealed with a film of polymer of about 1 to 5 mils in thickness which was free of liquid hydrocarbon. The sealing procedure was carried out with the loss of very little liquid hydrocarbon.

The above procedure was repeated employing the same procedure and conditions with a stream of hot air.

To test the effectiveness of the seal, the treated pellets were weighed immediately after cooling, allowed to remain exposed to the atmosphere at room temperature for three days, and weighed again. The results are seen below:

|  | Nitrogen Treated Pellet | Air Treated Pellet |
| --- | --- | --- |
| Initial Wt. _____grams__ | 11.825 | 10.185 |
| Wt. after 3 days_____grams__ | 11.225 | 9.570 |
| Wt. loss_____grams__ | 0.600 | 0.615 |
| Percent Wt. loss_____ | 5.06 | 6.04 |

A weight loss of about 15 percent was experienced with untreated pellets of the same size and under the same conditions. Thus the treating step formed an effective coating on the pellets and reduced the evaporation loss by about 60%.

*Example II*

A pellet of solidified hydrocarbon such as that described in Example I was sealed by dipping in hot ethylene glycol maintained at a temperature of 302° F. The pellet was kept submerged in the hot solution for approximately 3 minutes. It was then removed from the liquid and wiped dry. Examination showed it to be covered with a smooth, substantially non-porous skin of polyethylene over its outer surface.

*Example III*

A solid comprising 10 grams of trans-polybutadiene and about 100 ml. of n-heptane is heated according to the method of Example II to form a smooth substantially non-vaporous skin thereon.

It is within the scope of the present invention to accomplish the heating of the solid composition to form the "skin" thereon under a pressure such that unnecessary loss of normally fluid hydrocarbon is avoided. Forming a sealing "skin" under pressure is particularly advantageous in the event that the hydrocarbon is highly volatile or is normally gaseous in character.

As will be evident to those skilled in the art, many variations and modifications of this invention can be practiced in view of the foregoing disclosure. Such variations and modifications are clearly believed to come within the spirit and scope of the invention.

I claim:

1. The method of sealing a solid composition comprising 60–96 weight percent of a normally liquid hydrocarbon boiling above 100° F. and 4–40 weight percent of a normally solid polymer selected from the group consisting of polymers of 1-olefins having from 2 to 8 carbon atoms per molecule, trans-polymers having at least 70 percent trans-configuration formed by polymerizing at least one conjugated diene having 4–5 carbon atoms per molecule, and mixtures thereof which comprises:

heating the surface of said composition to melt the normally solid polymer in the surface of the composition; and cooling the thus melted normally-solid polymer in the surface of the composition to form a continuous solidified film of the normally solid polymer as the surface of the composition.

2. The method according to claim 1 wherein the surface of said composition is heated with a hot gas.

3. The method according to claim 1 wherein the surface of said composition is heated by immersion in a hot liquid.

4. The sealed composition formed by the method of claim 1.

5. The method according to claim 4 wherein the polymer is an ethylene-butene-1 copolymer.

6. The method according to claim 4 wherein the polymer is trans-polybutadiene.

References Cited by the Examiner

UNITED STATES PATENTS

| 2,445,311 | 7/1948 | Cooke et al. _____ 44—7 |
| 2,810,695 | 10/1957 | Young et al. _____ 252—59 X |
| 2,825,721 | 3/1958 | Hogan et al. _____ 252—59 X |
| 2,842,431 | 7/1958 | Robertson _____ 44—6 |
| 2,916,364 | 12/1959 | Grimes _____ 44—6 |
| 3,063,099 | 11/1962 | Turner et al. _____ 18—47.1 |
| 3,076,764 | 2/1963 | Hansen et al. _____ 252—59 |
| 3,084,033 | 4/1963 | Kelly et al. _____ 44—7 |

FOREIGN PATENTS

| 233,922 | 5/1961 | Australia. |
| 621,250 | 5/1961 | Canada. |

DANIEL E. WYMAN, *Primary Examiner.*